United States Patent [19]
Lewis et al.

[11] Patent Number: 6,026,442
[45] Date of Patent: Feb. 15, 2000

[54] METHOD AND APPARATUS FOR SURVEILLANCE IN COMMUNICATIONS NETWORKS

[75] Inventors: Lundy Lewis, Mason; Glenn Spargo, Brookline; Utpal Datta, Bedford, all of N.H.

[73] Assignee: Cabletron Systems, Inc., Rochester, N.H.

[21] Appl. No.: 08/976,866

[22] Filed: Nov. 24, 1997

[51] Int. Cl.$^7$ .................................................. G06F 15/173
[52] U.S. Cl. .......................... 709/229; 709/226; 713/201
[58] Field of Search ................................. 709/200, 226, 709/224, 229; 370/250, 254

[56] References Cited

U.S. PATENT DOCUMENTS

| | | | |
|---|---|---|---|
| 5,627,819 | 5/1997 | Dev et al. | 370/254 |
| 5,634,008 | 5/1997 | Gaffaney et al. | 395/200.11 |
| 5,634,009 | 5/1997 | Iddon et al. | 709/223 |
| 5,796,942 | 8/1998 | Esbensen | 709/229 |

FOREIGN PATENT DOCUMENTS

0478175 A1  4/1992  European Pat. Off. .

OTHER PUBLICATIONS

Jakobson, et al. Knowledge–Based GUI for Network Surveillance and Fault Analysis, IEEE, pp. 846–855, Jan. 1994.
Kim, et al. A Supervisor–Based Semi–Centralized Network Surveillance Scheme and the Fault Detection Latency Bound, IEEE, pp. 146–155, Jul. 1997.
"Tailorable Embedded Event Trace", IBM Technical Disclosure Bulletin, vol. 34, No. 7B, Dec. 1, 1991,. pp. 259–261, XP000282573.
Larson, A.K., "All Eyes On IP Traffic, New Apps Can Monitor Internet And Antranet Traffic, But Do They Deliver Enough Data To Hold ISPS To Their Promises?" Data Communications, vol. 26, No. 4, Mar. 21, 1997, pp. 54, 56–60, 62, XP000659549.
Rabie, S., "Applications of Expert Systems to Network", Network Management and Control, edited by A. Kershenbaum, 1990, pp. 224–262.
"Strategies for Monitoring and Managing Switched Networks", White Paper, Mar., 1996 Frontier Software Strategies.
"Lab Software Snares International Hacker", News Release, Apr. 2, 1996, Lawrence Livermore Labs.
"FBI Packet Sniffer Software Helped Catch Hacker", Computer Select, Newbytes, Inc., Jul., 1996.
"Network Management: Clear Communications unveils open, integrated software suite for carrier network surveillance and management; eliminates complexity of proprietary hardware–based management", Computer Select, Jul. 1996, Edge Publishing.

*Primary Examiner*—Dung C. Dinh
*Assistant Examiner*—William Titcomb
*Attorney, Agent, or Firm*—Wolf, Greenfield & Sacks, P.C.

[57] ABSTRACT

Control of network surveillance in communications networks is accomplished by dividing the surveillance task into two sub-tasks. The first sub-task automatically identifies communications within the network which are to be monitored. Such identification is accomplished by the application of a reasoning system to data received from the network. The identification of the data to be monitored is received by the second sub-task along with network topology information. The second sub-task also applies a reasoning system to this data in order to configure probes and switches within the network so that the identified data can be captured.

27 Claims, 5 Drawing Sheets

METHOD AND APPARATUS FOR SURVEILLANCE IN COMMUNICATIONS NETWORKS

BACKGROUND OF THE INVENTION

1. Field of the Invention

The present invention is directed to a method and apparatus for providing surveillance capabilities in a communications network, where the surveillance decisions are made automatically by an analysis of data traversing the network.

2. Description of Related Art

There is a large amount of traffic flowing through today's computer networks, and not all of this traffic is benign. Thus, the owner or supervisor of the network may need to "listen in on" network communications in order to effectively monitor and secure the network. Such monitoring or surveillance can be achieved by connecting a probe to the network in order to monitor data traveling between two or more nodes (e.g., user workstations) on the network.

Currently, the task of surveillance is "knowledge-intensive," in that human operators generally decide when it is advisable to survey, whom to survey, how long to survey, what kind of information to look for, and how to survey (i.e., where to place the network probes). Thus the surveillance task, as currently known, requires considerable intervention on the part of a human operator.

In a system where communications between two nodes is in a form of discrete packets, the network probe can "read" a packet of data in order to discover information such as the source and destination addressees of the packet, or the protocol of the packet. In addition, over time, measurements can be computed such as the average or total amount of traffic of a certain protocol type during a specific week, or a total number of packets sent to or from a node. This information may then be reported to a system administrator in real-time, or may be stored for later analysis.

Clearview Network Window, a software program available from Clear Communications Corporation, of Lincolnshire, Ill., U.S.A, allegedly provides predictive/proactive maintenance, intelligent root-cause analysis, and proof-of-quality reports. However, the output is designed for network fault management, which is not the same as "tapping" into a communication between nodes in the network. Thus, the Clearview system does not allow monitoring of data transferred between two nodes in the network with regard to content or characteristics.

Livermore National Laboratory, Livermore, Cali., U.S.A, developed a group of computer programs to protect the U.S. Department of Energy's computers by "sniffing" data packets that travel across a local area network. The United States Navy used one of these programs, known as the "iWatch" program, in order to wiretap on communications of a suspected computer hacker who had been breaking into computer systems at the U.S. Department of Defense and NASA. The iWatch program uses a network probe to read all packets that travel over a network and then "stores" this information in a common data repository. A simple computer program can then be written to read through the stored data, and to display only "interesting" information. What may be "interesting" is determined by the individual preparing the program and is defined in different ways, e.g., "login names that do not belong to the following: {X, Y, Z . . . }." Whenever an interesting piece of information is found within the stored data, the stored data is rescanned and a specific number of characters on both sides of the "interesting" piece are reported. These interesting characters are then reviewed in order to determine the content of the message and as a guide to future monitoring activity.

While the iWatch program appears to have been successful in catching at least one computer hacker, it has several limitations. Specifically, the decision to perform a surveillance session on a particular communication node was performed by an individual. This requires that knowledge be conveyed to the individual and that individual make a judgment to proceed with the surveillance. Once the decision to perform the surveillance is started, then all of the data which flows through the node is collected. In other words, the data collection step is not selective. All of the data is collected and stored in a large database for later analysis. Thus, the iWatch method is limited by the size of the database used. In order to provide the most flexibility, large storage units must be set aside, increasing the cost and complexity of the iWatch system. Further, the analysis of the collected data is not performed in real-time. Rather, the software program reads through the stored data in order to determine what is "interesting." Thus, there is a lag between the time that the data is collected, and the analysis to determine if there are communications which should be monitored. This can be a disadvantage since, many times, in order to catch a skilled computer hacker, it is necessary to react immediately to the hacker's presence. Finally, once the "interesting" data has been identified in the iWatch system, once again, an individual operator must make the determination as to where the network probe will be placed in the network in order to "tap" the desired communications. The requirements of human intervention are thus key steps in the iWatch surveillance system which reduces its efficiency and usefulness.

SUMMARY OF THE INVENTION

According to the present invention, a method and apparatus are provided for automatically and intelligently determining when and how to monitor network activity for surveillance purposes.

In a specific embodiment, the system utilizes two reasoning agents which in combination carry out the surveillance task. The inputs and outputs of these agents are defined, but there are several ways to construct the agents depending on the reasoning model or paradigm selected.

In one embodiment, a first reasoning agent receives accounting data from the network which includes a list of communications data sent over the network for a specified time period.

The list may include an identification of both the source and destination of the data, and may further identify the protocol used and volume of data sent.

The output of the first reasoning agent (which is provided as an input to the second reasoning agent) may include: whom-to-survey, when-to-survey, and a level-of-surveillance. For example, whom-to-survey may be expressed as communications either: a) sent from a given source; b) delivered to a given destination; or c) sent between a given source and destination. When-to-survey may be expressed as a time interval. Level-of-surveillance may take the form of: volume (data units in/out); protocol; and/or content.

Additional inputs to the second reasoning agent include the network topology and locations of network probes. The goal of the second reasoning agent is to determine which network probes to activate and the instructions needed to set parameters on these network probes in order to monitor, filter and provide the communications of interest (as determined by the output of the first reasoning agent).

By separating the tasks performed by the first and second reasoning agents, and constructing each agent to enhance the separate tasks, a more efficient method of surveillance is achieved.

For example, in a preferred embodiment, a rule-based reasoning system is used for the first reasoning agent, and a constraint-based reasoning system is used for the second reasoning agent, as described in greater detail below.

Surveillance decisions are thus made automatically rather than having decisions made by individuals, and the appropriately programmed tasks analyze the data and implement the surveillance. Specifically, the decision points of: 1) whether and whom to tap; 2) what level of tapping; 3) where to activate probes in the network; and 4) an interpretation of what is heard, can all be automatically accomplished.

The surveillance system of the present invention can be configured to act as either an advisor to a network administrator or configured to work in a fully-automated mode in which decisions are made and necessary actions taken without operator intervention.

The method and apparatus may be implemented in either a router-based or switch-based to network, or in a hybrid router/switch-based network.

These and other features and benefits of the present invention will be set forth in the following detailed description and drawings which are given by way of example only and are in no way restrictive.

DETAILED DESCRIPTION

A first embodiment of the invention will be described for use in a switch-based network. A switch-based network includes a plurality of devices, such as workstations, printers, storage devices, servers, etc., connected to one another through a plurality of switches. The switches are configured so as to direct a message, usually in the form of a data packet, from a source to a destination. For example, in the MMAC-Plus® system available from Cabletron Systems, Inc., Rochester, N.H., U.S.A., the switches may reside in a common chassis or be distributed amongst more than one chassis. Although a switch-based network is described, one of ordinary skill in the art will understand that the present invention can be applied in other types of networks.

Figure 1:
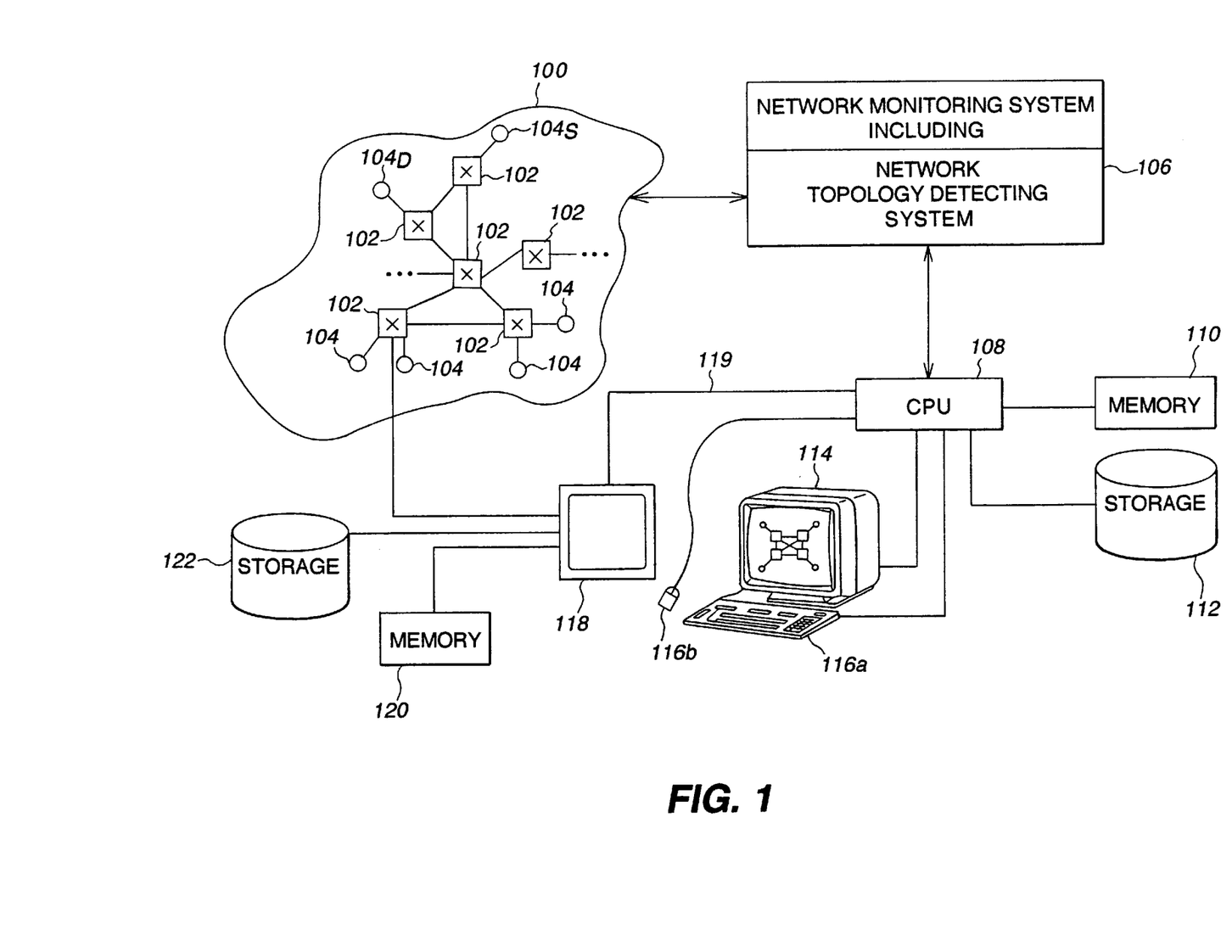
FIG. 1 is a schematic diagram of a network and system incorporating the present invention.

As shown schematically in FIG. 1, a switched network 100 includes a plurality of switches 102 connected to one another, and a plurality of end nodes 104 each connected to one or more of the switches 102. Data between any two end nodes 104 is sent through at least one switch 102. A network management system 106 includes a topology service, coupled to the network 100 so as to determine the topology of the network and to monitor other network functions. Spectrum®, a network management system available from Cabletron Systems, Inc., polls the network 100 on a regular basis in order to determine the status of the switches 102 and other network devices 104 and maintains information about the topology of the network and about the operations of the network devices.

A processing unit or CPU 108 is connected to the network management system 106 to receive information regarding the operation of the network 100. A memory 110 and storage device 112 are connected to the processor 108 to provide temporary and permanent storage, respectively, of information required by the processor 108. In one embodiment, processor 108 may be running VLAN Manager software available from Cabletron Systems, Inc., which enables "virtual" LANs to be established between different groups of users and/or applications. A display unit 114 is connected to the processor 108 so as to display, generally in graphic form, a representation of the network including its topology and functions. Through either keyboard and/or mouse input devices 116a, 116b, connected to the processor 108, and through the interface program of VLAN Manager, a user can perform various analyses of the network, control the configuration of the network, e.g., adding or deleting nodes and/or switches as the network changes, and monitor data transmissions, as discussed below in more detail.

The VLAN Manager is run on a processor capable of supporting at least one of Windows NT 3.51, Solaris 2.4 and 2.5.1, HP/UX 10.01 and 10.10, AIX 4.0, and IRIX 5.3 operating systems. Any one of a number of commercial or proprietary processors may be used. Generally, the CPU platform 108 requires a minimum of sixty-four Megabytes of RAM, 100 Megabytes of swap space and 150 Megabytes of available disk drive space.

If a user wishes to monitor data or communications between, for example, a source node $104_s$ and a destination node $104_D$ in the switched network (see FIG. 1), the user may connect a data analyzer or probe 118 to the network to review the "tapped" data. As disclosed in commonly assigned and co-pending U.S. patent application Ser. No. 08/790,473, entitled "Method and Apparatus to Establish a Tap-Point In a Switched Network Using Self-Configuring Switches Having Distributed Configuration Capabilities," by Yanacek et al., issued Aug. 19, 1999 U.S. Pat. No. 5,940,376 (hereinafter "Yanacek") which is herein incorporated by reference in its entirety, a user can plug the probe 118 into any switch 102 in the network to which the user has convenient access. Alternatively, a tap-point can be established as disclosed in commonly assigned U.S. patent application Ser. No. 08/370,158 entitled "Use of Multipoint Connection Services to Establish Call-Tapping Points in a Switched Network," by Dev et al., (hereinafter "Dev") which issued as U.S. Pat. No. 5,627,819 on May 6, 1997. which is also hereby incorporated by reference in its entirety. In either approach, a probe or tap-point can be established which either receives specific transmissions within the network or is configured to receive all data transmitted by the network.

The probe 118 includes a memory 120 and a storage device 122. In the systems referenced above, the probe 118 may be considered just another device in the switched network, similar to the workstations, printers, storage devices, servers, etc. In addition, there may be multiple probes connected to the switch and/or at other points in the network. As shown, the probe 118 communicates with the CPU 108 over interface 119.

Figure 2:
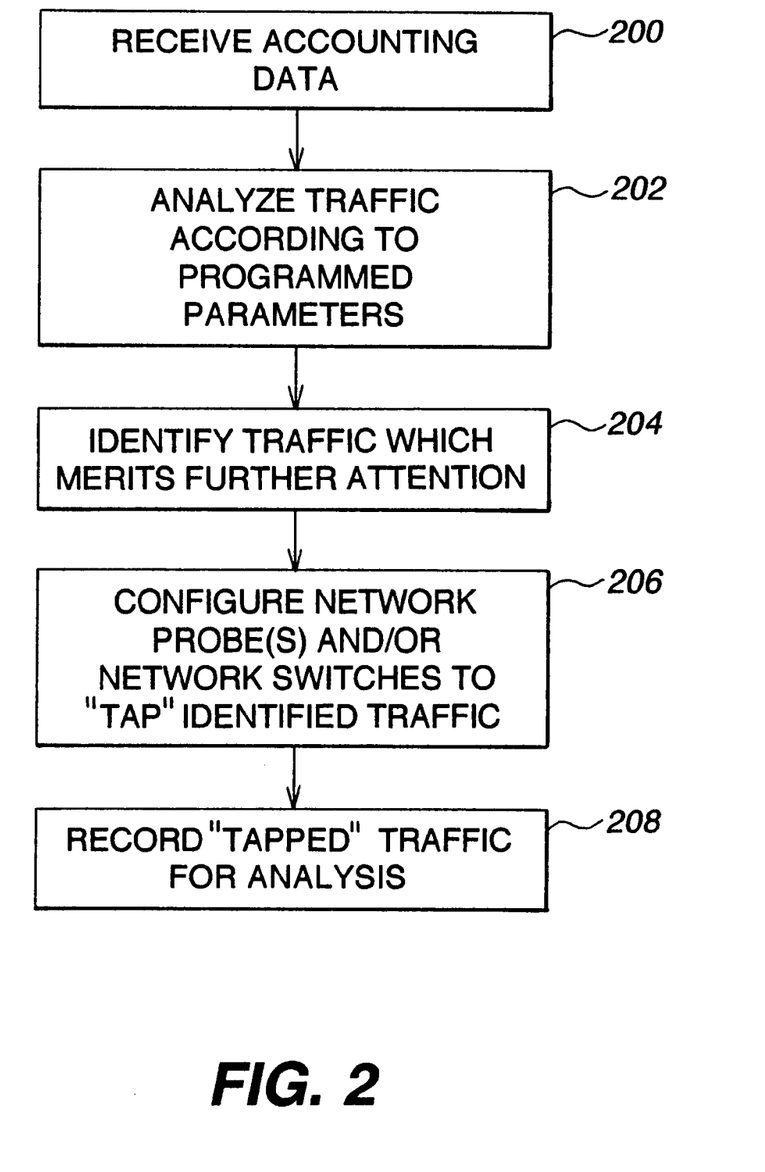
FIG. 2 is a flowchart representing an overview of operations performed in the present invention.

As an overview of the operation of the present invention, a flowchart as shown in FIG. 2 will be referenced. In step 200, accounting data (AD) is received by the processor 108. The accounting data consists of a list of communications over the network for some specified time period. The list may consist of source/destination pairs or may consist of further information such as the communications protocol used and volume of communications for each pair. As the accounting data is received, in step 202, the data is analyzed.

In the present invention, at step 204, traffic on the network which merits further attention is identified. This identification is accomplished automatically and in real-time by the application of reasoning paradigms, e.g., rule-based reasoning, case-based reasoning, constraint based reasoning, fuzzy logic or neural net analysis. Additional discussion of these and other reasoning paradigm's can be found in *Artificial Intelligence: A Modem Approach* by Stuart Russell and Peter Norvig, Prentice Hall, N.J., 1995. By application of any one or more of these reasoning approaches, any traffic on the network which is "suspect" or which requires further analysis is automatically identified. The parameters which define "suspect" traffic or transmissions within the network are set within the reasoning system, as discussed below in more detail.

Once network traffic or data to be tapped or monitored is identified in step 204, the network probe or probes, and/or network switch or switches, are configured in order to collect the data identified in step 206. The identification of the probes and/or switches to be used and/or configured is determined from an analysis of the topology of the network in combination with the system being used for setting up a tap which, as above, can be either the Liessner or Dev systems referenced above. The determination as to how to configure the probe and/or switches is also based upon an application of reasoning approaches which were discussed with regard to step 204. Of course, the criteria for determining which switches and probes to use in order to tap into a given connection in the switched network differs from those used in establishing the criteria for identifying the traffic to be monitored in step 204. Once the probe and switches have been configured, in step 208, the identified traffic is "tapped" and stored for analysis. In this manner, the occurrence of network traffic which merits further attention can be automatically identified without the intervention of an operator and thus accomplished in real-time.

As used in this specification, "real-time" is a matter of degree and not a true/false absolute. Real-time in the short term involves reasoning about those tasks that require close to instantaneous action, with minimal time to think about options, plans, strategies, etc. Real-time in the long term involves reasoning about tasks for which there is time to think about options, plans, etc., i.e., tasks for which action is not urgent.

Figure 3:
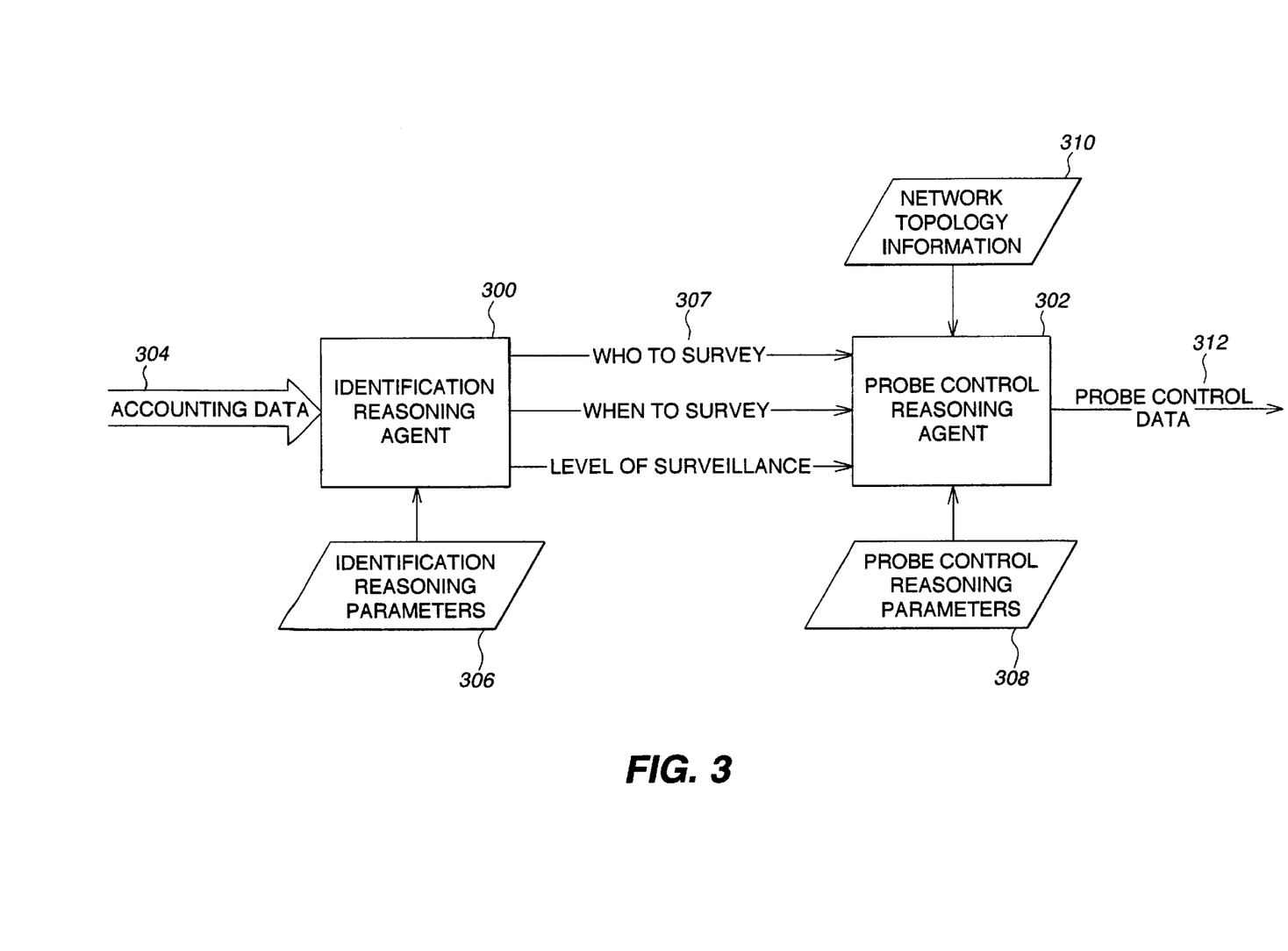
FIG. 3 is a block diagram representation of one embodiment of the present invention.

Within the processing unit 108, the functions as disclosed in steps 202 and 204 are accomplished within an Identification Reasoning (IR) agent 300 as shown in FIG. 3. The IR agent 300 can be implemented as a software program operating within the processing unit 108. The operation of configuring network probes and/or network switches in order to tap identified traffic as per step 206 is performed within a Probe Control Reasoning (PCR) agent 302, which is coupled to the IR agent 300. Similar to the IR agent 300, the PCR agent 302 is a software program which operates on the output from the IR agent 300.

As shown in FIG. 3, the IR agent 300 receives accounting data 304 as an input along with information reasoning (IR) parameters 306. The IR parameters 306 are determined by an operator and are the criteria used by the IR agent 300 in order to identify network traffic or data which merits further attention. The IR parameters 306 include, but are not limited to, particular user names, logical source or destination addresses, physical source or destination addresses, traffic volume thresholds which when exceeded may cause further analysis, communications from or to particular nodes in the network, communications between particular nodes (the classic "wire-tap"), and communications routed through a particular switch or switches in the network. While nodes are being represented in the preferred embodiment, the present invention would also be applicable to monitoring data communication from/to particular sources or destinations no matter the node at which the source or destination is located since the probe can identify a packet by its source or destination address. The accounting data 304 may include, but once again is not limited to, communications over the network for a specified time period. This information may also include source/destination pairs or may consist of further information such as communications protocol and volume of communications for each pair.

The IR agent 300 monitors traffic in real-time or in a database and is triggered by lo abnormal events. As an example, the IR agent 300 might simply look at all "spikes" or sudden increases in a parameter and review the sources and destinations of the message units that caused the spike. As a further example, when all traffic data for a particular period of time has been downloaded to an accounting database, for example, the IR agent 300 might be programmed to look for instances of links with exceedingly high volume. Those links that exceed a predetermined threshold would then be chosen for further investigation.

The IR agent 300 applies the IR parameters 306 to the accounting data 304 in order to provide a three part output. Output decision data 307 includes information regarding: 1) who to survey; 2) when to survey; and 3) a level of surveillance. The indication of who to survey could include, but is not limited to, all communications delivered from a given source, all communications delivered to a given destination, or all communications between a given source and destination. The level of surveillance may indicate collection of, for example, the volume of communication, expressed in data units in or out; the protocol being used by the particular message; and/or the contents of the communication, i.e., the message.

The PCR agent 302 receives the who, when and level information from the IR agent 300. The PCR agent 302 also receives probe control reasoning parameters 308 and network topology information 310. The PCR agent 302 automatically applies the network topology information and the reasoning parameters in order to determine probe control output information 312 to configure the probes and switches in order to carry out the monitoring of data as per the output from the IR agent 300.

The probe control output information 312 coming from the PCR agent 302 is in a form such that the network management system 106 is able to configure the switches so as to accomplish the tap. Accordingly, the PCR agent 302 would include information regarding, for example, either the Liessner method and apparatus, or the Dev multipoint connection service, so that commands can be executed. The PCR agent 302 stores the format structures for a multitude of different networks and/or switching protocols. The network topology information 310 would then include an indication as to the type of network so that the PCR agent 302 could format its probe control information 312 accordingly. Further, a universal standard could be established whereby the probe control information 312 is in a standard format which is not specific to any particular vendor's network management platform. Any network management platform which conforms to the standard would receive this standardized probe control information and translate it so that the tapping connections could be established. In this manner, as new network management platforms become available, the PCR agent need not be updated since its output is of a form that any new network management platform (which complies with the standard) can understand.

Figure 4:
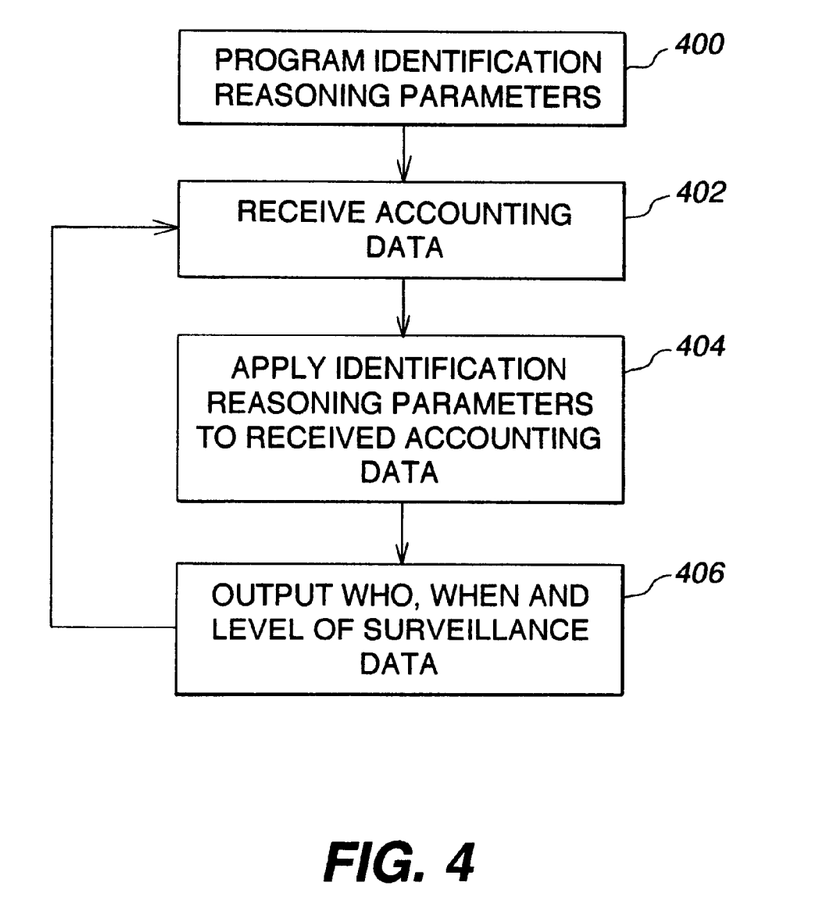
FIG. 4 is a flowchart showing the steps performed in the identification reasoning agent.

Operations within the IR agent 300 will now be discussed in more detail with regard to the flowchart shown in FIG. 4. In step 400, the reasoning parameters are programmed into the IR agent 300. In a preferred embodiment, a rule-based reasoning system has been used in the IR agent 300.

In step 402, the accounting data, as described above, is received by the IR agent 300. The reasoning parameters, according to the rule-based reasoning system, are applied to the received accounting data in step 404. In step 406, the who, when and level results, which are the results of the application of the reasoning parameters to the accounting data, are output. As long as accounting data is received in step 402, steps 404 and 406 are executed. Of course, if necessary, step 400 can be executed when the rules of the rule-based reasoning system need to be changed or updated.

A rule-based reasoning system was chosen for the information reasoning agent since it is relatively easier to understand than case-based reasoning, fuzzy logic, neural networks or other reasoning paradigms. Further, and more importantly, since the monitoring of a network can be expensive, a reasoning paradigm that operates in close to real-time and uses minimal CPU cycles is desirable. A one-ply rule-based system satisfies this requirement since it functions in a manner similar to a look-up table. There are, however, disadvantages associated with a rule-based system since it cannot learn and evolve as the usage of the network evolves. This represents a trade-off between thoroughness and speed. Certainly, depending upon the resources available and desired thoroughness of analysis, other reasoning systems can be used rather than a rule-based system.

The rules which determine how to identify network communications which are to be monitored are established in the IR agent 300. Merely as examples as to how the rules may function, the following scenarios are provided:

Scenario 1: the network in question is proprietary and all of the users and agents send short and to-the-point messages.

Rule for scenario 1: if any packet is more than X bytes long, then the source of the packet is suspect.

Scenario 2: the network is proprietary, and agents always send messages of protocol type Y.

Rule for scenario 2: if any packet is not of type Y, then the source and destination of the packet are suspects.

Scenario 3: the network is proprietary and it is known that server S should never receive any messages, in other words, there should be no attempts to log onto this server S.

Rule for scenario 3: if any packets have a destination S, then the source of the packet is suspect .

Figure 5:
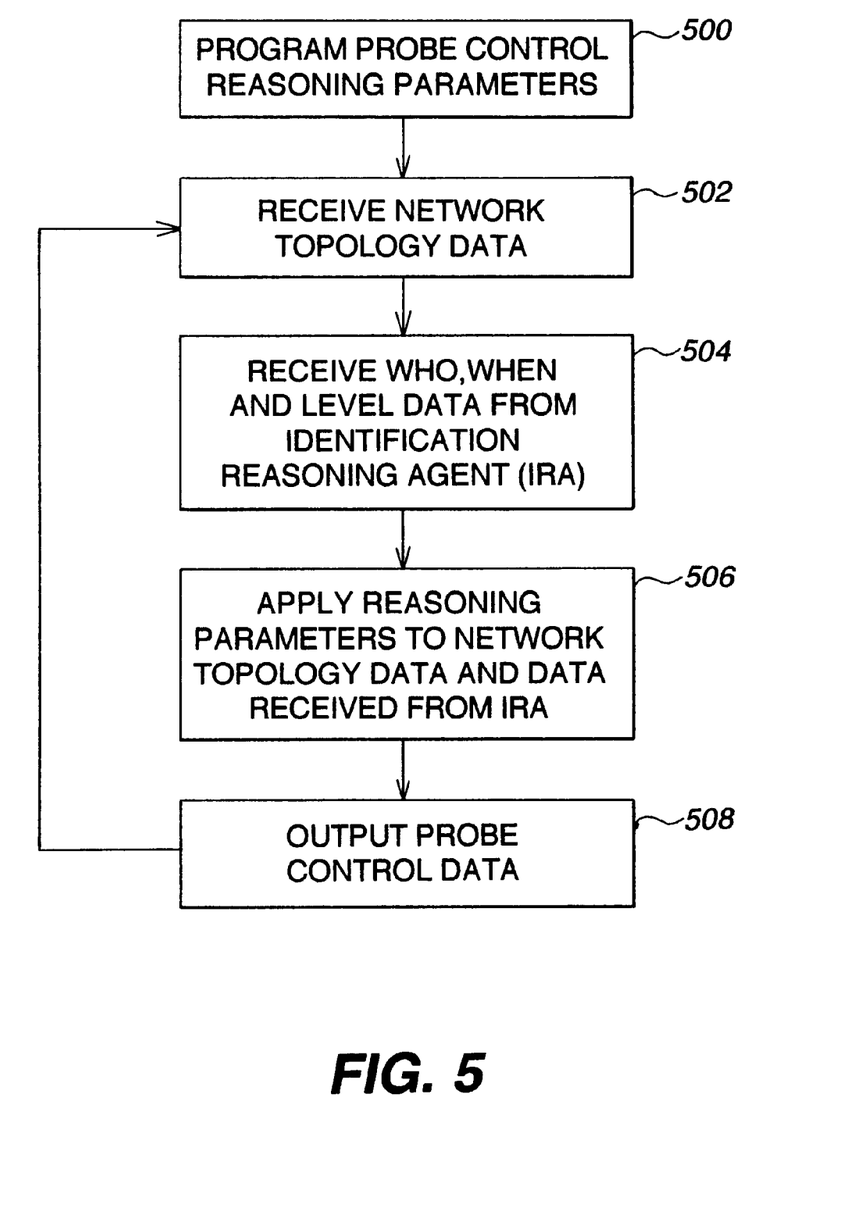
FIG. 5 is a flowchart representing the steps performed in the probe control reasoning agent.

The PCR agent 302 is programmed with the reasoning parameters in step 500 as shown in FIG. 5. A constraint-based reasoning system has been chosen in the preferred embodiment for the PCR agent 302. Constraint-based reasoning was chosen because, at this stage of the surveillance task, the required analysis becomes more complex. The constraints imposed on the PCR agent 302 are the who to survey, when to survey, level of surveillance information, and the network topology information 310 which includes the locations of any available probes.

A goal of constraint-based reasoning is to satisfy as many of the constraints as possible. As an example, the level of surveillance might have to be down-graded from actual content to data units in/out in order to satisfy all the other constraints. Alternatively, the who of surveillance might have to be down-graded from source and destination to only source. In general, there will be several ways to satisfy some, but not all, of the constraints.

As an example, one of the controls in the case-based reasoning system may require that given a choice between down-grading the level of surveillance or who to survey, always down grade the who to survey, setting. It should be noted that the who to survey, when to survey and level of surveillance are "soft-constraints." The placement of probes, however, is typically a "hard-constraint" and the network topology is an even harder constraint.

Once the constraint parameters of the PCR agent 302 are established, the network topology data is received in step 502. The PCR agent 302 is constantly updated with the network topology data so that its perception of the network is accurate. As is known, the topology of a network is dynamic and may change over time. The PCR agent 302 must have information about the topology of the network in order to make proper connections when attempting to tap into communications in the network. In step 504, the who, when and level data are received from the IR agent 300. The constraint-based reasoning algorithms are applied to the network topology data and the data received from the IR agent 300 in step 506. The output from the PCR agent 302, i.e., the probe control data 312, is determined and output in step 508.

This probe control data is used to control the configuration of switches and probes in the network so that the desired data can be monitored. Control then returns to step 502, the receipt of the network topology data, and steps 504, 506, 508 are repeated. The network topology data is constantly received so that existing taps are maintained in the event that the topology of the network changes. In other words, if there is a change to the topology which disrupts the tapping of particular network communications, the PCR agent 302 will respond to the topology change so as to maintain the tapping of the data. This may involve rerouting communications to a probe, using a different probe, or reporting that a tap can no longer be maintained because of a change in the topology of the switching system.

The two reasoning agents 300, 302 in combination carry out the surveillance task. The inputs and the outputs of these agents have been determined, but one of ordinary skill in the art can see that there are several ways to construct the reasoning agents depending on the reasoning paradigm utilized. Thus, for a preferred embodiment, a rule-based reasoning system was selected for the IR agent 300 and a constraint-based reasoning system was chosen for the PCR agent 302, however, it is clear that different reasoning systems may be chosen, respectively, for the agents.

Although the present embodiment is disclosed within the operation of a switch-based network, it is clear that the invention also applies to router-based networks and hybrid router/switch-based networks. Further, as is known, many kinds of network probes are commercially available. No assumptions nor restrictions about vendor-specific probes have been made. An example of a commonly available probe is the Intelligent RMON/RMON2 Enterprise Probe available from Frontier Software Development, Inc., Chelmsford, Mass., U.S.A. This Enterprise Probe uses the RMON standard to provide diagnostic operations for complex network configurations.

Having thus described an embodiment of the present invention, various modifications and improvements will occur to those skilled in the art which are intended to be part of this disclosure and within the scope of the invention. Accordingly, the foregoing description is by way of example only and is not intended as limiting.

What is claimed is:

1. A method of monitoring data transmitted between nodes in a network, the method comprising steps of:
   (a) receiving, in real-time, data transmitted in the network;
   (b) analyzing, in real-time, the received data and identifying subsequent particular data and first and second nodes to be monitored;
   (b1) reconfiguring the network so that at least one identified node on the network, different from the first and second nodes, receives the identified particular data;
   (c) monitoring, in real-time, the identified subsequent particular data at the particular node; and
   (d) storing the monitored subsequent particular data in a storage device.

2. The method as recited in claim 1, wherein step (b) comprises a step of:
   applying a reasoning operation to the received data to identify the particular data.

3. The method as recited in claim 2, wherein the reasoning operation is a rule-based operation.

4. The method as recited in claim 1, wherein the received data comprises identification of a source of the received data and identification of a destination of the received data.

5. The method as recited in claim 4, wherein the received data further comprises:
   at least one of a protocol and a volume of data associated with the source and destination.

6. The method as recited in claim 4, wherein step (b) comprises steps of:
   applying a rule-based operation to the received data to identify the at least one identified node to receive and monitor the subsequent particular data, a time period for the monitoring, and a level of the monitoring.

7. The method as recited in claim 6, further comprising at least one step of:
   monitoring identified subsequent particular data delivered to at least one of the first and second nodes;
   monitoring identified subsequent particular data sent from at least one of the first and second nodes; and
   monitoring identified subsequent particular data sent between at least one of the first and second nodes.

8. The method as recited in claim 6, wherein the level of monitoring comprises at least one of:
   counting a number of data units;
   determining a type of protocol used; and
   determining a content of the particular data.

9. An apparatus for monitoring data transmitted between nodes in a network, the apparatus comprising:
   means for receiving, in real-time, data transmitted in the network;
   means, connected to the receiving means, for analyzing, in real-time, the received data and for identifying subsequent particular data and first and second nodes for monitoring;
   means, connected to the analyzing and identifying means, for reconfiguring the network so that at least one identified node on the network, different from the first and second nodes, receives the identified subsequent particular data in the network; and
   means for storing the monitored particular data.

10. The apparatus as recited in claim 9, wherein the analyzing and identifying means comprise:
    means for applying a rule-based reasoning operation to the received data to identify the particular data.

11. The apparatus as recited in claim 10, wherein the monitoring means comprise:
    means for applying a constraint-based reasoning operation to monitor identified subsequent particular data.

12. The apparatus as recited in claim 10, wherein the received data comprises identification of a source of the received data and identification of a destination of the received data.

13. The apparatus as recited in claim 12, wherein the received data further comprises at least one of a protocol and volume of data associated with the source and destination.

14. The apparatus as recited in claim 11, wherein the means for analyzing determines at least one of:
    the at least one node in the network to perform the monitoring;
    a time period during which the monitoring is to occur; and
    a level of the monitoring.

15. The apparatus as recited in claim 9, wherein the means for analyzing determines at least one of:
    means for identifying at least one of the first and second nodes whose output data is to be monitored;
    means for identifying at least one of the first and second nodes where all data directed to the identified first and second node is to be monitored; and
    means for identifying the first and second nodes wherein all data between the first and second nodes is to be monitored.

16. An apparatus for monitoring data communications in a network, the apparatus comprising:
    a first reasoning agent, having a first input to receive accounting data from the network and a second input to receive first reasoning parameters, for generating and outputting identification data by applying the first reasoning parameters to the accounting data according to a first reasoning operation; and
    a second reasoning agent, having a third input to receive the identification data from the first reasoning agent, a fourth input to receive second reasoning parameters and a fifth input to receive network topology data, for generating and outputting probe control data to reconfigure the network by applying the second reasoning parameters to the identification data and the network topology data according to a second reasoning operation.

17. The apparatus according to claim 16, wherein the identification data comprises at least one of:
    data identifying at least one node in the network to monitor;
    data identifying a time period during which monitoring of the at least one identified node is to occur; and
    data indicating a level of the monitoring.

18. The apparatus according to claim 16, wherein the probe control data comprises:
    network switch configuration data.

19. The apparatus according to claim 16, wherein the first reasoning operation is a rule-based operation and the second reasoning operation is a constraint-based operation.

20. The apparatus according to claim 16, wherein each of the first and second reasoning agents comprises:

a processing unit; and a memory unit coupled to the processing unit, the memory unit storing a program according to the respective reasoning operation.

21. An apparatus for monitoring data communications in a network, the apparatus comprising:

a first reasoning agent for identifying data communications within the network to be monitored; and a second reasoning agent, coupled to the first reasoning agent, for reconfiguring at least one switch within the network to redirect the identified data communications.

22. The apparatus as recited in claim 21, wherein:

the first reasoning agent receives accounting data from the network and outputs identification data by applying a first reasoning operation.

23. The apparatus as recited in claim 22, wherein:

the second reasoning agent receives the identification data from the first reasoning agent and outputs probe control data by applying a second reasoning operation.

24. The apparatus according to claim 23, wherein the identification data comprises at least one of:

data identifying at least one node in the network to monitor;

data identifying a time period during which monitoring of the at least one identified node is to occur; and data indicating a level of the monitoring.

25. The apparatus according to claim 23, wherein the probe control data comprises:

network switch configuration data.

26. The apparatus according to claim 23, wherein the first reasoning operation is a rule-based operation and the second reasoning operation is a constraint-based operation.

27. The apparatus according to claim 23, wherein each of the first and second reasoning agents comprises:

a processing unit; and a memory unit coupled to the processing unit, the memory unit storing a program according to the respective reasoning operation.

* * * * *